(12) United States Patent
Lv et al.

(10) Patent No.: US 12,183,020 B2
(45) Date of Patent: Dec. 31, 2024

(54) METHOD AND APPARATUS TO COMPLEMENT DEPTH IMAGE

(71) Applicant: Samsung Electronics Co., Ltd., Suwon-si (KR)

(72) Inventors: Zhaohui Lv, Xi'an (CN); Weijia Zhang, Xi'an (CN); Mingming Fan, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 17/411,200

(22) Filed: Aug. 25, 2021

(65) Prior Publication Data

US 2022/0067950 A1 Mar. 3, 2022

(30) Foreign Application Priority Data

Aug. 31, 2020 (CN) .................. 202010900253.X
May 24, 2021 (KR) .................. 10-2021-0066115

(51) Int. Cl.
| | | |
|---|---|---|
| G06T 7/55 | (2017.01) | |
| G06N 3/08 | (2023.01) | |
| G06T 5/50 | (2006.01) | |
| G06V 10/56 | (2022.01) | |
| G06V 10/82 | (2022.01) | |

(52) U.S. Cl.
CPC .............. G06T 7/55 (2017.01); G06N 3/08 (2013.01); G06T 5/50 (2013.01); G06V 10/56 (2022.01); G06V 10/82 (2022.01); *G06T 2207/20081* (2013.01); *G06T 2207/20084* (2013.01); *G06T 2207/20221* (2013.01)

(58) Field of Classification Search
None
See application file for complete search history.

(56) References Cited

U.S. PATENT DOCUMENTS

2017/0032676 A1    2/2017    Mesmakhosroshah et al.

FOREIGN PATENT DOCUMENTS

| CN | 111340814 A | 6/2020 |
|---|---|---|
| CN | 111401380 A | 7/2020 |
| CN | 111429515 A | 7/2020 |
| KR | 10-2011-0004267 A | 1/2011 |
| KR | 10-2013-0019080 A | 2/2013 |

(Continued)

OTHER PUBLICATIONS

Yang et al., "Depth super-resolution via fully edge-augmented guidance," 2017 IEEE Visual Communications and Image Processing (VCIP), pp. 1-4 (Year: 2017).*

(Continued)

*Primary Examiner* — Vincent Rudolph
*Assistant Examiner* — Nicholas Crespo Stazer
(74) *Attorney, Agent, or Firm* — NSIP Law

(57) ABSTRACT

A method and apparatus for complementing a depth image are provided. The method includes obtaining a color image and a corresponding depth image, obtaining a first depth image based on the color image, using a first deep neural network (DNN), obtaining a second depth image based on the depth image and an intermediate feature image generated by each intermediate layer of the first DNN, using a second DNN, and obtaining a final depth image by merging the first depth image and the second depth image.

27 Claims, 8 Drawing Sheets

(56) References Cited

FOREIGN PATENT DOCUMENTS

KR     10-2014-0126826 A     11/2014
KR     10-1970488 B1     4/2019

OTHER PUBLICATIONS

C. Qiu et al., "Improving Transfer Learning and Squeeze-and-Excitation Networks for Small-Scale Fine-Grained Fish Image Classification," 2018, IEEE Access, vol. 6, pp. 78503-78512 (Year: 2018).*

J. Qiu et al., "DeepLiDAR: Deep Surface Normal Guided Depth Prediction for Outdoor Scene From Sparse LiDAR Data and Single Color Image," 2019 IEEE/CVF Conference on Computer Vision and Pattern Recognition (CVPR), pp. 3308-3317 (Year: 2019).*

Huang et al., "Indoor Depth Completion with Boundary Consistency and Self-Attention," 2019 IEEE/CVF International Conference on Computer Vision Workshop (ICCVW), pp. 1070-1078 (Year: 2019).*

Zhao et al., "Adaptive Context-Aware Multi-Modal Network for Depth Completion," 2020, arXiv preprint arXiv:2008.10833 (Year: 2020).*

* cited by examiner

METHOD AND APPARATUS TO COMPLEMENT DEPTH IMAGE

CROSS-REFERENCE TO RELATED APPLICATIONS

This application claims the benefit under 35 USC § 119 (a) of Chinese Patent Application No. 202010900253.X filed on Aug. 31, 2020, in the China National Intellectual Property Administration and Korean Patent Application No. 10-2021-0066115 filed on May 24, 2021, in the Korean Intellectual Property Office, the entire disclosures of which are incorporated herein by reference for all purposes.

BACKGROUND

Field

The following description relates to image processing, and to a method and apparatus for complementing a depth image.

Description of Related Art

High-quality, complete depth image information may play an important role in many depth information-based applications, such as, for example, three-dimensional (3D) reconstruction, autonomous driving, augmented reality (AR), robotics, and the like. However, current consumer-grade depth cameras have some issues, for example, a missing depth value due to poor image quality, a sparse depth image, or the presence of a cavity. For such issues, a conventional depth map complementing algorithm may be broadly classified into two categories: one is a traditional method based on filtering, and the other is a deep learning method that fills a depth value by constructing a regression model.

A depth image may be expanded and filled based mainly on, for example, filtering and a Markov random field model, and use texture information such as edges to obtain a complete depth image. This type of method may, however, need manual designing of many functions, which restricts the development of the method.

The deep learning method may construct a regression model and construct a mapping from an original depth image to a complete depth image through the model. This type of method may, however, have some disadvantages such as a blurry output image, a fuzzy edge, and dissatisfaction with the effects from edge portions and large missing depth portions.

A method of complementing a depth image based on deep learning has made some progress. This method may be classified into two categories based on whether to use red, green, blue (RGB) image information: a guiding method using an RGB image and a guiding method without using an RGB image. The guiding method without using an RGB image may generally use, for example, an encoder-decoder and a generative adversarial network (GAN), to construct a regression model, and such a method of constructing a single regression model has achieved a tangible result in the field of color image restoration. However, an accurate depth value may be needed for depth recovery, and this method may have some issues such as simple interpolation or neighboring pixel duplication, which may result in a blurry output image and an unclear edge. The guiding method using an RGB image may be used to mine RGB image information through feature coding and feature fusion and guide a process of compensating for a depth, and may thereby achieve an improvement of accuracy. However, the effects from an edge portion and a wide range of a missing depth portion may still be unsatisfactory.

The issues that may arise from the existing deep learning-based methods may be mainly found in terms of the following aspects.

First, in a method that does not adopt an intermediate representation, an existing feature fusion method may be too simple to effectively fuse a color image and a depth image, and thus an effect of a generated depth image may not be desirable. For example, due to simple image splicing or pixel-wise addition in an inputting stage or a feature stage, information fusion may not be sufficient. In another example, even by extracting multi-level features respectively from a depth map and an RGB map using a pyramid network and fusing them with an input part of a decoder, a result therefrom may still be undesirable with an insufficient quality of edges, an insufficient degree of texture restoration, and an incomplete structure.

Second, in a method that adopts an intermediate representation, an existing method may transform a color image into an intermediate representation through a depth network and generate a depth image through the intermediate representation to simplify the difficulty of network prediction, thereby improving the quality of the depth image. For example, to simplify the difficulty of network prediction at each stage, a surface normal and an occlusion boundary may be provided as intermediate representations, and an original depth map may be finally complemented through global optimization. For another example, a branching network for learning a representation of an intermediate feature may be provided, and then the intermediate feature may be spliced to an RGB image and a depth image for depth prediction. The effectiveness of complementing a depth in such a way may vary according to the quality generated with manually extracted features or intermediate representations and to a strategy for fusing the features.

3. Most existing depth image complementing methods may aim at a specific single target for which a depth is to be complemented. For example, a DeepLiDAR method, a multi-scale cascade hourglass network, and the like may include only sparse to dense depth complementing methods. For another example, there is a depth complementing method based on a cavity image. However, the conventional methods may not be universal and robust.

Thus, there is a desire for a method and apparatus for enhancing the effect of complementing a depth image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of complementing a depth image, including obtaining a color image and a corresponding depth image, obtaining a first depth image based on the color image, using a first deep neural network (DNN), obtaining a second depth image based on the depth image and an intermediate feature image generated by each intermediate layer of the first DNN, using a second DNN, and obtaining a final depth image by merging the first depth image and the second depth image.

The first DNN may include a first encoder network and a first decoder network having an N-layer residual structure, and the second DNN may include a second encoder network and a second decoder network having an N-layer residual structure, wherein N may be an integer greater than 1, and the obtaining of the second depth image may include performing feature decoding using the second decoder network, based on an output of the first encoder network and the second encoder network, an intermediate feature image of the first decoder network, and an intermediate feature image of the second encoder network.

The obtaining of the second depth image may include performing feature encoding using the second encoder network of the second DNN, based on the color image and an intermediate feature image of the first encoder network.

The first DNN may include a first preprocessing network preceding the first encoder network, and a first depth prediction network after the first decoder network, wherein the obtaining of the first depth image may include transforming the color image into a first feature image for DNN processing using the first preprocessing network and inputting the first feature image to the first encoder network, and synthesizing, into the first depth image, a feature image output from the first decoder network using the first depth prediction network, and the second DNN may include a second preprocessing network preceding the second encoder network, and a second depth prediction network after the second decoder network, wherein the obtaining of the second depth image may include transforming the depth image into a second feature image for DNN processing using the second preprocessing network and inputting the second feature image to the second encoder network, and obtaining the second depth image by fusing the second feature image and a feature image output by the first decoder network and the second decoder network, using the second depth prediction network.

An input of a first layer decoding unit of the second decoder network may be a sum of a feature image output from the second encoder network and a feature image output from the first encoder network, an input of each layer decoding unit of the second decoding unit from a second layer up to an Nth layer may include a feature image obtained by fusing a feature image output from a previous layer of the second decoding unit, a feature image output from a corresponding layer decoding unit of the first decoder network, and a feature image output from a corresponding layer encoding unit of the second encoder network, using a squeeze-and-excitation (SE) block-based method, and an input of the second depth prediction network may include a feature image obtained by fusing a feature image output from the second decoder network, a feature image output from the first decoder network, and the second feature image using the SE block-based method.

An input of a first layer encoding unit of the second encoder network may include a sum of the first feature image and the second feature image, and an input of each layer encoding unit from a second layer up to an Nth layer of the second encoder network may be a sum of a feature image output from a previous layer encoding unit and a feature image output from a corresponding layer encoding unit of the first encoder network.

A residual block of each of the second encoder network and the second decoder network may be configured to execute a gated process in response to executing a convolution process.

The obtaining of the final depth image by merging the first depth image and the second depth image may include obtaining a first pixel weight map of the first depth image and a second pixel weight map of the second depth image, using an attention network, and obtaining the final depth image by assigning a weight to each of the first depth image and the second depth image based on the first pixel weight map and the second pixel weight map and obtaining a sum therefrom.

The method may include generating a loss function based on a first mean squared error (MSE) loss of the first depth image and an actual depth image, a second MSE loss of the second depth image and the actual depth image, a third MSE loss of the final depth image and the actual depth image, and a structural loss of the final depth image and the actual depth image, and training the first DNN, the second DNN, and/or the attention network using the loss function before using the first DNN, the second DNN, and/or the attention network, wherein the structural loss may include 1-structural similarity index measure (SSIM).

The training of the first DNN, the second DNN, and/or the attention network may include obtaining the loss function based on a weighted summation of the first MSE loss, the second MSE loss, the third MSE loss, and the structural loss.

The obtaining of the color image and the depth image may include obtaining, as the depth image, a depth image of which a pixel value may be 0, in response to an absence of the depth image.

In another general aspect, there is provided an apparatus for complementing a depth image, including an image acquirer configured to obtain a color image and a corresponding depth image, a color brancher configured to obtain a first depth image based on the color image, using a first deep neural network (DNN), a depth brancher configured to obtain a second depth image based on the depth image and an intermediate feature image generated by each intermediate layer of the first DNN, using a second DNN, and an image merger configured to obtain a final depth image by merging the first depth image and the second depth image.

The first DNN may include a first encoder network and a first decoder network having an N-layer residual structure, and the second DNN may include a second encoder network and a second decoder network having an N-layer residual structure, wherein N may be an integer greater than 1, and the depth brancher may be configured to perform feature decoding using the second decoder network, based on an output of the first encoder network and the second encoder network, an intermediate feature image of the first decoder network, and an intermediate feature image of the second encoder network.

The depth brancher may be configured to perform feature encoding using the second encoder network of the second DNN, based on the depth image and an intermediate feature image of the first encoder network.

The first DNN further may include a first preprocessing network preceding the first encoder network, and a first depth prediction network after the first decoder network, wherein the color brancher may be configured to transform the color image into a first feature image for DNN processing using the first preprocessing network, input the first feature image to the first encoder network, and synthesize, into the first depth image, a feature image output from the first decoder network using the first depth prediction network, and the second DNN may include a second preprocessing network preceding the second encoder network and a second depth prediction network after the second decoder network, wherein the depth brancher may be configured to transform the depth image into a second feature image for DNN processing using the second preprocessing network, input the second feature image to the second encoder network, and obtain the second depth image by fusing the second feature image and a feature image output by the first decoder network and the second decoder network using the second depth prediction network.

The image merger may be configured to obtain a first pixel weight map of the first depth image and a second pixel weight map of the second depth image, using an attention network, and obtain the final depth image by assigning a weight to each of the first depth image and the second depth image based on the first pixel weight map and the second pixel weight map and obtaining a sum therefrom.

The apparatus may include a trainer configured to generate a loss function based on a first mean squared error (MSE) loss of the first depth image and an actual depth image, a second MSE loss of the second depth image and the actual depth image, a third MSE loss of the final depth image and the actual depth image, and a structural loss of the final depth image and the actual depth image, and train the first DNN, the second DNN, and/or the attention network using the loss function before using the first DNN, the second DNN, and/or the attention network, wherein the structural loss may include 1-structural similarity index measure (SSIM).

The trainer may be configured to obtain the loss function based on a weighted summation of the first MSE loss, the second MSE loss, the third MSE loss, and the structural loss.

Other features and aspects will be apparent from the following detailed description, the drawings, and the claims.

Figure 1A:
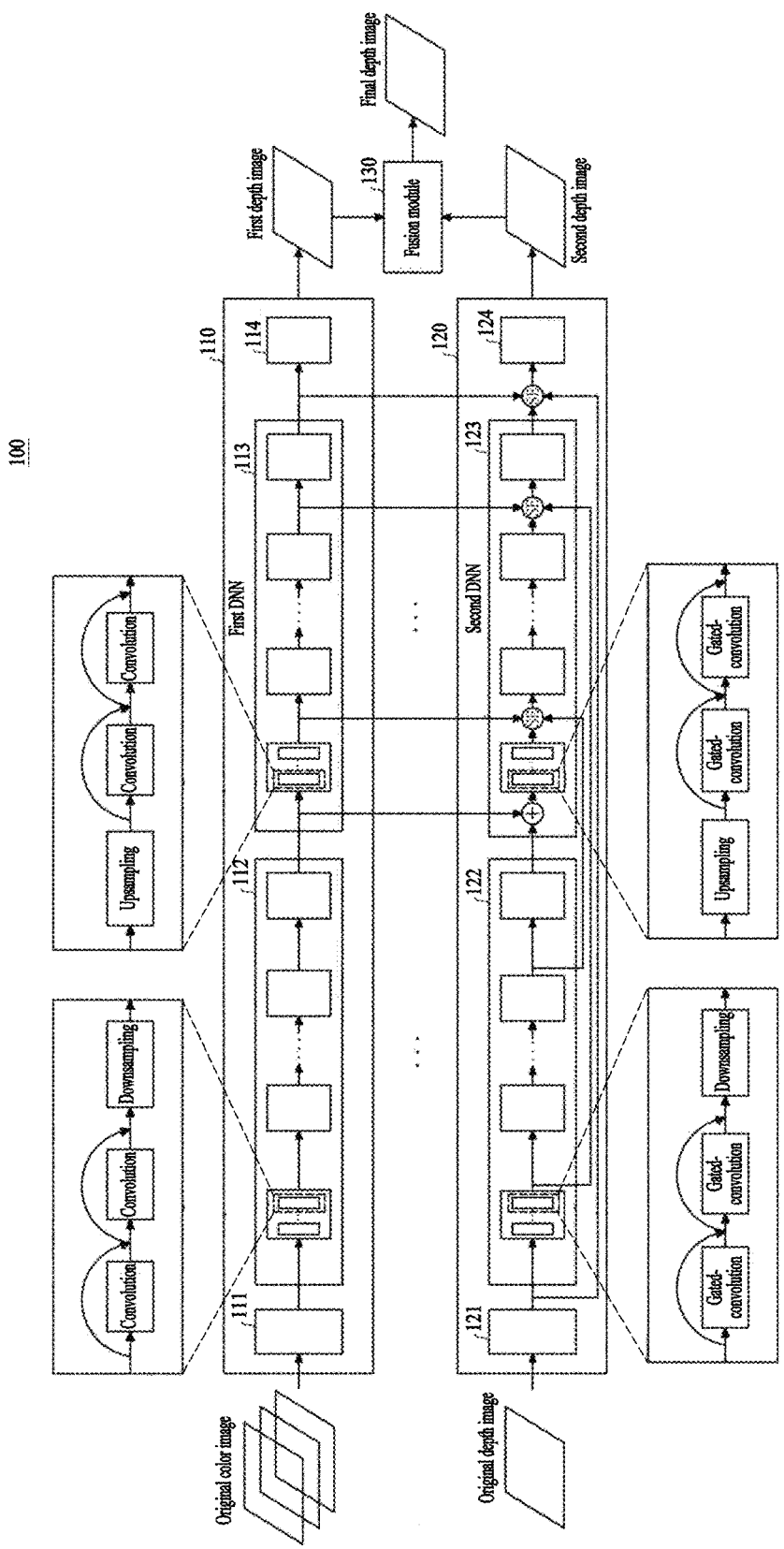
FIG. 1A illustrates an example of a depth image complementing model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. As used herein, the singular forms are intended to include the plural forms as well, unless the context clearly indicates otherwise. As used herein, the term "and/or" includes any one and any combination of any two or more of the associated listed items.

Although terms such as "first," "second," "third," A, B, C, (a), (b), and (c) may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples. Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

The following description provides a deep learning-based method of complementing a depth image based on a color image. The method may use a depth image complementing model that includes two branching networks-a color branching network and a depth branching network. Of the two networks, the color branching network may obtain a complete depth image using an original color image for depth estimation, and the depth branching network may perform an inference and obtain another complete depth image using the original depth image and feature images of some intermediate layers of the color branching network, and then merge the two complete depth images to generate a finally complemented depth image.

The methods disclosed herein may train or learn a mapping from a color image to a complete depth image through a network and complement the depth image maximally using information of the color image. Thus, even when an original depth image is extremely sparse, or even when an original depth image is not present, the method may allow a model to stably generate a high-quality complete depth image, thereby achieving great results by filling a depth cavity and by densifying a sparse depth. In addition, in order for the network to effectively distinguish between valid and invalid pixels in an image, the method may allow a generated depth image to preserve original depth information, and to transmit mask information using gated-convolution in the depth branching network. A gated operation of the gated-convolution may effectively identify positions of the valid and invalid pixels. In an example, a weight of a valid pixel may be greater than a weight of an invalid pixel. In addition, in order to ensure rich detailed information of a finally generated depth image and an increased edge quality, training or learning of a deep learning network model described herein may be complemented by monitoring a structural similarity index measure (SSIM)-related structural loss. In addition, the depth image complementing model described herein may perform end-to-end training or learning, thereby avoiding the use of intermediate features and effectively avoiding the risk from a low quality of intermediate features.

Hereinafter, a method and apparatus for complementing a depth image according to example embodiments of the present disclosure will be described in detail with reference to FIGS. 1 to 7. Hereinafter, a method of complementing a depth image will be referred to as a depth image complementing method, and an apparatus for complementing a depth image will be referred to as a depth image complementing apparatus.

Hereinafter, the depth image complementing method will be described with reference to the accompanying drawings.

FIG. 1A illustrates an example of a depth image complementing model.

Figure 1B:
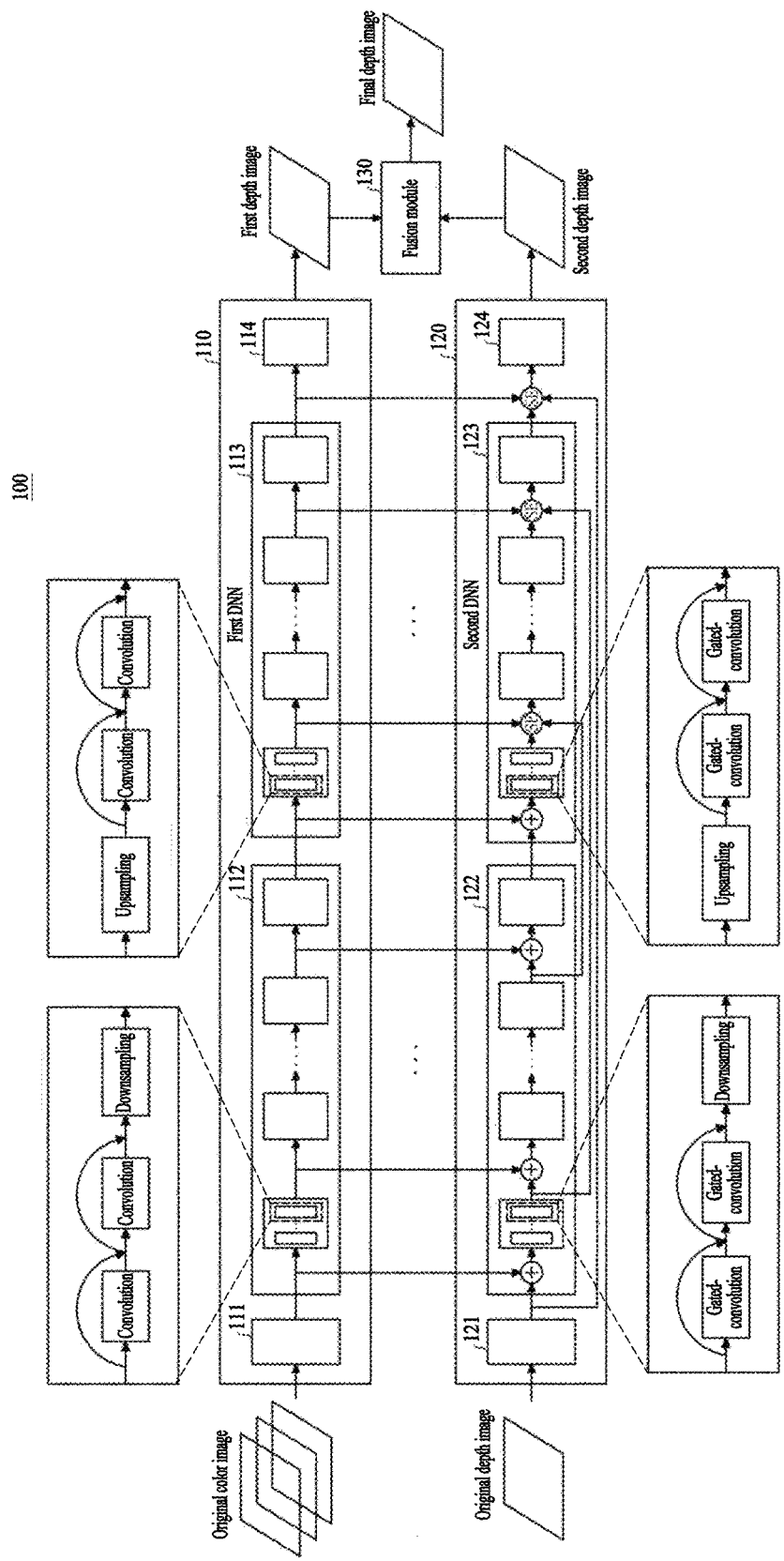
FIG. 1B illustrates another example of a depth image complementing model.

FIG. 1B illustrates another example of the depth image complementing model.

Referring to FIGS. 1A and 1B, a depth image complementing model 100 may include a first deep neural network (DNN) 110 (i.e., a color branching network), a second DNN 120 (i.e., a depth branching network), and a fusion module 130.

The first DNN 110 may be used to perform depth estimation based on an original color image, for example, a red, green, blue (RGB) image, to obtain a depth image. Thus, an input of the first DNN 110 may be the original color image, and an output of the first DNN 110 may be the depth image. The second DNN 120 may be used to perform an inference based on an original depth image and feature images of some intermediate layers of the first DNN 110 to obtain a depth image. In an example, an input of the second DNN 120 may be the original depth image, an input of an intermediate layer of the second DNN 120 may be a feature image output from an intermediate layer of the first DNN 110, and an output of the second DNN 120 may be the depth image.

The fusion module 130 may be used to generate a finally complemented depth image by merging or fusing the depth image output from the first DNN 110 and the depth image output from the second DNN 120.

Here, the original color image and the original depth image may be obtained by simultaneously capturing the same scene at the same position by a matched and calibrated color camera and depth camera, and then registering the two images. In another example, the original color image and the original depth image may be obtained from a local memory or local database as needed. In another example, the original color image and the original depth image may be received from an external data source (e.g., Internet, server, database, etc.) via an input device or a transmission medium. The original color image and the original depth image may be images corresponding to each other. For example, the original color image and the original depth image collected by a sensor through image registration may be projected into the same coordinate system such that pixels of the two images correspond to each other one-to-one.

In one example, a main structure of the first DNN 110 may include an encoder-decoder network that is formed by stacking residual blocks. Such a residual structure may facilitate the effect of transferring a feature of a lower layer of the network to an upper layer of the network, thereby allowing the network to preserve texture information and structure information of the feature of the lower layer. For example, as illustrated, the first DNN 110 may include a first encoder network 112 and a first decoder network 113 having an N-layer residual structure. In this example, N is an integer greater than 1.

The first DNN 110 may further include a first preprocessing network 111 before an encoder network (e.g., the first encoder network 112) and a first depth prediction network 114 after a decoder network (e.g., the first decoder network 113). In addition, feature fusion may be performed by which a feature image output by at least one of the first preprocessing network 111, the first encoder network 112, and the first decoder network 113 of the first DNN 110 is preserved and then input in parallel to a corresponding layer of the second DNN 120. The feature fusion will be described in detail later.

The first preprocessing network 111 may be used to transform the input original color image into a first feature image suitable for DNN processing and input the first feature image to the first encoder network 112. For example, the first preprocessing network 111 may include at least one convolutional layer. In an example, the first preprocessing network 111 may perform a convolution on the original color image without changing the size.

The first encoder network 112 may perform feature encoding on the first feature image through a cascaded coding unit having the N-layer residual structure. Here, N is an integer greater than 1.

A coding unit of each layer of the first encoder network 112 may include a plurality of cascaded residual blocks. Each residual block may perform at least one convolution process on an input feature image, and a last residual block may perform at least one convolution process and one downsampling process on an input feature image. A value of N, the number of residual blocks, and the number of times of convolutions performed by a residual block may not be limited by the examples described herein. For example, the first encoder network 112 may include four coding units and each coding unit may include two residual blocks. Each residual block may include two convolutional layers, and a last residual block may include two convolutional layers and one downsampling layer (a downsampling coefficient is ½). Thus, the resolution of an output feature image of the first encoder network 112 may be ¹⁄₁₆th of the resolution of an input feature image. Thus, the resolution of the input original color image may be an integer multiple of 16, for example, 304×224.

In addition, each residual block may further include one normalization layer (e.g., a batch normalization layer) and an activation layer (e.g., a parametric rectified linear unit (PReLU) layer). The normalization layer may normalize an input feature image such that an output feature has the same scale. The activation layer may non-linearize the normalized feature image.

The first decoder network 113 may perform feature decoding on a feature image output from the first encoder network 112 by decoding units having a cascaded N-layer residual structure. That is, the first decoder network 113 may sample the same residual structure and restore an image resolution to an original resolution through a corresponding number of deconvolution operations (implemented through upsampling and convolution). For example, a decoding unit of each layer of the first decoder network 113 may include a plurality of cascaded residual blocks. Each residual block may perform at least one convolution process on an input feature image, and a first residual block may perform one upsampling process and at least one convolution process on an input feature image. A value of N, the number of residual blocks, and the number of times of convolutions performed by a residual block may not be limited by the examples described herein. For example, the first decoder network 113 may include corresponding four decoding units and each decoding unit may include two residual blocks. In an example, each residual block may include two convolutional layers, and a first residual block may include one upsampling layer (an upsampling coefficient is 2) and two convolutional layers. Thus, the resolution of an output feature image of the first decoder network 113 may be restored to an original resolution.

In addition, each residual block may further include one normalization layer (e.g., a batch normalization layer) and an activation layer (e.g., a PRELU layer). The normalization layer may normalize an input feature image such that an output feature has the same scale. The activation layer may non-linearize the normalized feature image.

The first depth prediction network 114 may synthesize a feature image output from the first decoder network 113 into a single depth image (e.g., a first depth image). The original color image may be transformed into a feature image of C channels after passing through convolution processing of the first preprocessing network 111, the first encoder network 112, and the first decoder network 113. For example, C may be 32, 64, 128, and the like. Thus, the first depth prediction network 114 may synthesize the feature image of the C channels into a depth image of a single channel. For example, the first depth prediction network 114 may include two convolutional layers to synthesize the feature image of the C channels into the depth image of the single channel. In this example, a first convolutional layer may reduce feature channels to half of the original feature channels, that is, C/2, and a second convolutional layer may compress a feature image of the C/2 channels into the depth image of the single channel. In addition, one normalization layer (e.g., a batch normalization layer) and an activation layer (e.g., a PReLU layer) may be further included between the first convolutional layer and the second convolutional layer. The normalization layer may normalize a feature image output from the first convolutional layer such that an output feature has the same scale. The activation layer may non-linearize the normalized feature image and output a result of the non-linearizing to the second convolutional layer.

In one example, a structure of the second DNN 120 may be basically the same as that of the first DNN 110, and its main structure may also be constructed as an encoder-decoder network that is formed by stacking residual blocks. For example, the second DNN 120 may include a second encoder network 122 and a second decoder network 123 having an N-layer residual structure. The second DNN 120 may further include a second preprocessing network 121 before the encoder-decoder network (e.g., the second encoder network 122 and the second decoder network 123) and a second depth prediction network 124 after the encoder-decoder network (e.g., the second encoder network 122 and the second decoder network 123). Each of the second preprocessing network 121, the second encoder network 122, the second decoder network 123, and the second depth prediction network 124 may perform the same functions as corresponding networks in the first DNN 110.

A difference between the first DNN 110 and the second DNN 120 may include a decoding step of the second decoder network 123. In the decoding step of the second decoder network 123, an input of each decoding unit may be a feature image obtained by fusing a feature image output from an upper layer, a feature image output from a corresponding layer of the first DNN 110, and a feature image output from a corresponding layer in a coding step of the second encoder network 122, using a squeeze-and-excitation (SE) block method.

In addition, a difference between the first DNN 110 and the second DNN 120 may a coding step of the second encoder network 122. In the coding step of the second encoder network 122, an input of each coding unit may be a feature image obtained by fusing a feature image output from an upper layer and a feature image output from a corresponding layer of the first DNN 110, using a directly adding method.

In addition, a difference between the first DNN 110 and the second DNN 120 may include each residual block of the second encoder network 122 and the second decoder network 123 may adopt a gated-convolution. That is, a gated operation may be added after each convolutional layer.

For example, the second preprocessing network 121 may be used to transform the input original depth image into a second feature image suitable for DNN processing. For example, the second preprocessing network 121 may include at least one convolutional layer. The second preprocessing network 121 may convolute the original depth image without changing the size.

In one example, the second encoder network 122 may perform feature coding based on the original depth image through only coding units having a cascaded N-layer residual structure. For example, as illustrated in FIG. 1A, the second encoder network 122 may perform feature coding on the second feature image output by the second preprocessing network 121 through the coding unit having the cascaded N-layer residual structure.

For example, the second encoder network 122 may perform feature coding based on the original depth image and an intermediate feature image output from each intermediate layer of the first encoder network 112 through the coding units having the cascaded N-layer residual structure. For example, as illustrated in FIG. 1B, the second encoder network 122 may perform feature coding based on the second feature image, the first feature image, and the feature image output from each intermediate layer of the first encoder network 112. As described above, a feature image output by at least one of the first preprocessing network 111, the first encoder network 112, and the first decoder network 113 of the first DNN 110 may be preserved and be input in parallel to a corresponding layer of the second DNN 120, and feature fusion may thereby be performed. For example, as illustrated in FIG. 1B, a sign ⊕ indicates a direct addition. As described above, an input of a first layer decoding unit of the second decoder network 123 may be a feature image obtained by directly adding the first feature image output from the first preprocessing network 111 and the second feature image output from the second preprocessing network 121. An input of each layer coding unit from a second layer up to an Nth layer of the second encoder network 122 may be a feature image obtained by directly adding a feature image output from an upper layer coding unit and a feature image output from a corresponding layer coding unit of the first encoder network 112. For example, an input of each second layer coding unit of the second encoder network 122 may be a feature image obtained by directly adding a feature image output from a first layer coding unit of the second encoder network 122 and a feature image output from a first layer coding unit of the first encoder network 112. For a subsequent input, the same may be applied.

A coding unit of each layer of the second encoder network 122 may include a plurality of cascaded residual blocks. Each residual block may perform at least one convolution process on an input feature image, and a last residual block may perform at least one convolution process and one downsampling process on an input feature image. However, a value of N, the number of residual blocks, and the number of times of convolutions performed by a residual block may not be limited by the examples described herein. For example, the second encoder network 122 may include four coding units and each coding unit may include two residual blocks. Each residual block may include two convolutional layers, and a last residual block may include two convolutional layers and one downsampling layer (a downsampling coefficient is ½). Thus, a resolution of an output feature image of the second encoder network 122 may be ¹⁄₁₆th of a resolution of an input feature image. Thus, a resolution of the input original color image may be an integer multiple of 16, for example, 304×224

In an example, each residual block of the second encoder network 122 may further include one normalization layer (e.g., a batch normalization layer) and an activation layer (e.g., a PRELU layer). The normalization layer may normalize an input feature image such that an output feature has the same scale. The activation layer may non-linearize the normalized feature image.

In an example, the second decoder network 123 may perform feature decoding based on a feature image output from the second encoder network 122, a feature image output from the first encoder network 112, a feature image output from each intermediate layer of the second encoder network 122, and a feature image output from each intermediate layer of the first decoder network 113, through coding units having a cascaded N-layer residual structure. As described above, the feature images output by the first preprocessing network 111, the first encoder network 112, and the first decoder network 113 of the first DNN 110 may be preserved and input in parallel to corresponding layers of the second DNN 120, and feature fusion may thereby be performed. For example, as illustrated in FIGS. 1A and 1B, a sign ⊕ indicates a direct addition, and a sign indicates an SE block-based fusion, which will be further described hereinafter.

An input of a first layer decoding unit of the second decoder network 123 may be a feature image obtained by directly adding a feature image output from the second encoder network 122 and a feature image output from the first encoder network 112. An input of each layer decoding unit from a second layer up to an Nth layer of the second decoder network 123 may be a feature image obtained by fusing a feature image output from an upper layer decoding unit, a feature image output from a corresponding layer decoding unit of the first decoder network 113, and a feature image output from a corresponding layer coding unit of the second encoder network 122, using an SE block. For example, an input of a second layer decoding unit of the second decoder network 123 may be a feature image obtained by fusing a feature image output from a first layer decoding unit of the second decoder network 123, a feature image output from a first layer decoding unit of the first decoder network 113, and a feature image output by an N−1th layer encoding unit of the second encoder network 122, using the SE block.

A decoding unit of each layer of the second decoder network 123 may include a plurality of cascaded residual blocks. Each residual block may perform at least one convolution process on an input feature image, and a first residual block may perform one upsampling process and at least one convolution process on an input feature image. A value of N, the number of residual blocks, and the number of times of convolutions performed by a residual block may not be limited by the examples described herein. In addition, each residual block may perform a gated process after each convolution process, which will be described in detail hereinafter. For example, the first decoder network 113 may include four corresponding decoding units and each decoding unit may include two residual blocks. Each residual block may include two convolutional layers, and a first residual block may include one upsampling layer (a upsampling coefficient is 2) and two convolutional layers. Thus, a resolution of an output feature image of the first decoder network 113 may be restored to the original resolution.

In addition, each residual block may further include one normalization layer (e.g., a batch normalization layer) and an activation layer (e.g., a PRELU layer). The normalization layer may normalize an input feature image such that an output feature has the same scale. The activation layer may non-linearize the normalized feature image.

The second depth prediction network 124 may synthesize, into a single depth image (e.g., a second depth image), a feature image formed by fusing a feature image output from the second decoder network 123, a feature image output from the first decoder network 113, and the second feature image output from the second preprocessing network 121. For example, as illustrated in FIGS. 1A and 1B, a sign indicates an SE block-based fusion, which will be described in detail hereinafter. As described above, an input of the second depth prediction network 124 may be a feature image obtained by fusing a feature image output from the second decoder network 123, a feature image output from the first decoder network 113, and the second feature image output from the second preprocessing network 121, using the SE block. It can be seen that the feature image is obtained by fusing the second feature image output from the network 121. The original depth image may be transformed into a feature image of C channels after passing through the second preprocessing network 121, the second encoder network 122, and the second decoder network 123. For example, C may be 32, 64, 128, and the like. Thus, the second depth prediction network 124 may need to synthesize the feature image of the C channels into a depth image of a single channel. For example, the first depth prediction network 114 may include two convolutional layers for synthesizing the feature image of the C channels into the depth image of the single channel. In this example, a first convolutional layer may reduce feature channels to half of the original feature channels, that is, C/2, and a second convolutional layer may compress a feature image of the C/2 channels into the depth image of the single channel. In addition, one normalization layer (e.g., a batch normalization layer) and an activation layer (e.g., a PRELU layer) may be further included between the first convolutional layer and the second convolutional layer. In this example, the normalization layer may normalize a feature image output from the first convolutional layer such that an output feature has the same scale. The activation layer may non-linearize the normalized feature image and output a result of the non-linearizing to the second convolutional layer.

Hereinafter, an SE block and a gated convolution used in the second DNN 120 will be described in detail.

An SE block may allow a network to automatically learn a feature weight of each channel, and expand a weight of a valid feature and reduce a weight of an invalid or ineffective feature, and to selectively use a different feature, when, for example, C2 channel features need to be compressed into C1 channel features (where C2 may be an integer multiple of C1). In the second DNN 120, the SE block may be used to train or learn weights of different features and fuse the features with the learned weights.

Figure 2:
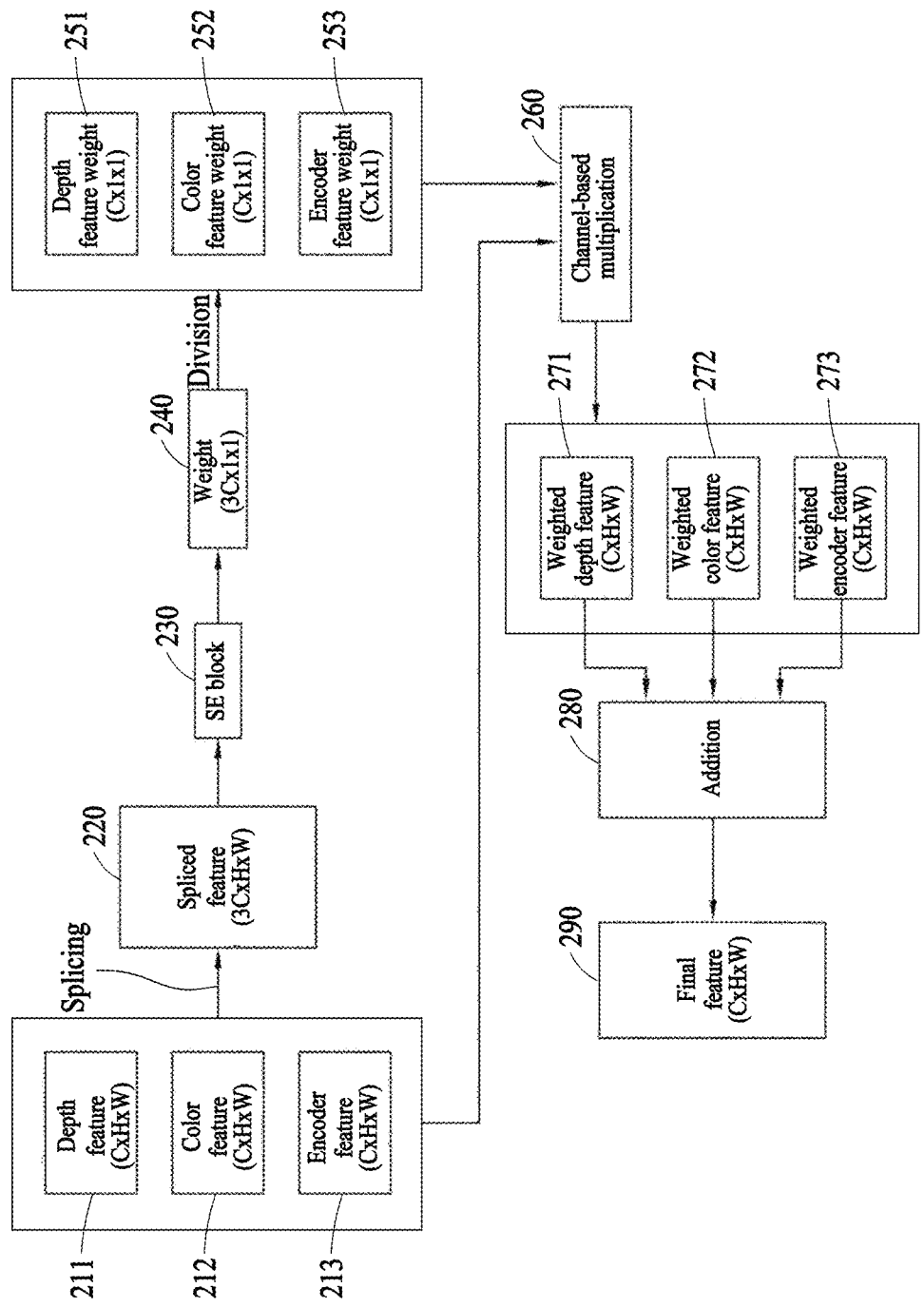
FIG. 2 illustrates an example of a squeeze-and-excitation (SE) block fusion method.

FIG. 2 illustrates an example of an SE block fusion method.

Referring to FIG. 2, for a second layer decoding unit of the second decoder network 123, a single 3C-channel feature vector (e.g., a spliced feature 220) may be obtained by splicing a C-channel feature image (e.g., a depth feature 211) output by a first layer decoding unit of the second decoder network 123, a C-channel feature image (e.g., a color feature 212) output by a first layer decoding unit of the first decoder network 113, and a C-channel feature image (e.g., an encoder feature 213) output by an N−1th layer encoding unit of the second encoder network 122. Subsequently, through an SE block 230, a weight graph 240 having a quantity of 3C for feature vectors of 3C channels may be generated.

The weight graph 240 may then be divided into weight vectors of which three channels are C, for example, a depth feature weight 251, a color feature weight 252, and an encoder feature weight 253, in the original order. Here, a range of each weight may be 0-1.

In an example, weights may be assigned to the original three C-channel feature images through a channel multiplication 260, and three C-channel feature images to which the weights are assigned, for example, a weighted depth feature 271, a weighted color feature 272, and a weighted encoder feature 273, may be generated.

In an example, a final single C-channel feature image (or a fused feature image) 290 may be generated through a channel addition 280, and provided as an input of a second layer decoding unit of the second decoder network 123.

For other modules of the second DNN 120 that use an SE block fusion method, for example, other layer decoding units of the second decoder network 123 and the second depth prediction network 124, an input may be generated as described above.

Gated Convolution are further described below.

A gated convolution may be used to process all inputs as valid pixels in a general convolution. That is, while the general convolution may not identify an invalid pixel in an image, the gated convolution may add one gated task based on the general convolution and generate a corresponding weight through a module using a learnable parameter to suppress an original output through the weight.

A task of restoring an original image may indicate valid pixels and invalid pixels using a 0/1 mask. However, a convolution process may be similar to local filtering, information of neighboring pixels may be used. When only a 0/1 mask indication is simply used, a pixel confidence may not be applied.

For example, an original image may be shown as follows.

| 2 | 0 | 1 |
|---|---|---|
| 1 | 2 | 3 |
| 0 | 0 | 1 |

A corresponding mask may be shown as follows.

| 1 | 0 | 1 |
|---|---|---|
| 1 | 1 | 1 |
| 0 | 0 | 1 |

After a 3×3 convolution in which a weight is 1, pixels may be shown as follows.

| 10 |
|----|

A corresponding mask may be shown as follows.

| 1 |
|---|

That is, an output may still be 10 even after the network considers that output values are all valid values, ignores 0 included in the original image, and applies a weight accordingly. However, after a gated convolution is added, a corresponding weight of 0.6 may be generated through the gated convolution, and a weight value of 6 may be output. Thus, the network may output 6 to which the weight is applied, considering that all the information of the original input image are not necessarily valid values, and may thus suppress an output at a corresponding position. When the number of 0s in the original image increases, this value may decrease. When the original input is all 0, the mask may also be 0 and an output confidence may also be 0. Through such a mechanism, a weight may be assigned to an output of the network.

When a gated operation is added after a convolution operation in the second DNN 120 due to insufficiency of an original depth image, positions of valid and invalid pixels may be effectively identified, and a weight of a valid pixel may be set to be greater than that of an invalid pixel. In addition, spatial monitoring may be performed on an output feature image, and thus a capability of the network for an omitted or missing image may be improved.

Referring back to FIG. 1, the fusion module 130 may obtain a finally complemented depth image (that is, a final depth image) by merging a first depth image output by the first DNN 110 and a second depth image output by the second DNN 120.

In one example, the fusion module 130 may be implemented as an attention module. The fusion module 130 may also be implemented in other methods, and the methods of implementing the fusion module 130 are not limited to a specific example. Hereinafter, a method of implementing the fusion module 130 through the attention module will be described in detail.

The attention module may obtain the final depth image by generating two weight maps of two depth images input through a trainable or learnable network module, multiplying again an original depth image by the weight maps, and adding depth images to which weights are applied. The attention module may perform monitoring at a spatial position, and output all weights corresponding to respective pixels in the depth images. That is, the output weight maps may have the same resolution as the depth images. For example, the size of a depth image may be H×W, and the size of a weight map may also be H×W.

Figure 3:
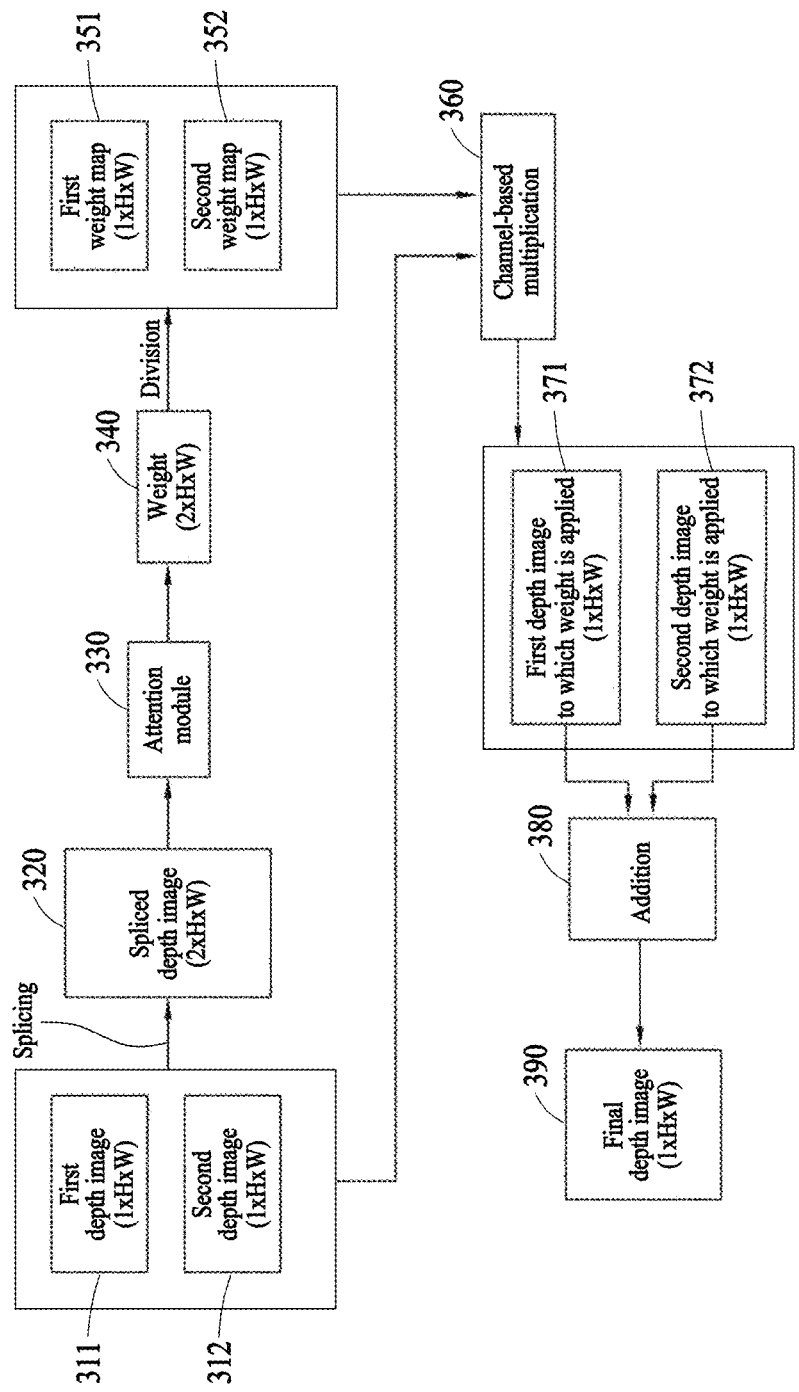
FIG. 3 illustrates an example of an attention mechanism-based fusion method.

FIG. 3 illustrates an example of an attention mechanism-based fusion method.

Referring to FIG. 3, a first depth image 311 (e.g., D1) and a second depth image 312 (e.g., D2) may be input, and then the first depth image 311 and the second depth image 312 may be spliced to obtain a spliced depth image 320. The spliced depth image 320 may be input to an attention module 330, and a weight map 340 may be generated by generating a weight of each pixel of the spliced depth image 320. The generated weight map 340 may be divided into two weight maps 351 and 352 (e.g., W1 and W2) respectively corresponding to the first depth image 311 and the second depth image 312 in the original order. In operation 360, the two weight maps 351 and 352 may be multiplied pixel-wise with the first depth image 311 and the second depth image 312, respectively, and thus a first depth image 371 to which the weight is applied (or simply a weighted first depth image 371) may be obtained and a second depth image 372 to which the weight is applied (or simply a weighted second depth image 372) may be obtained. In operation 380, the weighted first depth image 371 and the weighted second depth image 372 may be added pixel-wise, and a final depth image 390 (e.g., D) may then be obtained. Such a process described above may be represented by Equation 1 below.

$$D = D1 \odot W1 + D2 \odot W2 \quad \text{[Equation 1]}$$

In Equation 1, D1 denotes a first depth image output from the first DNN 110, and D2 denotes a second depth image output from the second DNN 120. In addition, W1 and W2 denote weights corresponding to the first depth image and the second depth image, respectively. $\odot$ denotes a multiplication of corresponding pixels.

Referring back to FIG. 1, the depth image complementing model 100 may have many advantages. First, during a depth complementing task, a depth estimation method using a color image may be applied. Through supervised learning, a color branch may learn a mapping from the color image to a depth image. The depth image obtained through the depth estimation may have sufficient detailed information, sharp edges, and desirable visual effects, due to a high resolution and sufficient texture information of the color image. Second, the depth image complementing model 100 may perform end-to-end training or learning without depending on an intermediate representation and a manual designing characteristic, and thus a network may avoid a risk that a quality of another feature is degraded during training, thereby increasing a training or learning speed. Third, a depth estimation network (that is, the first DNN 110) may be independent of a depth prediction network (that is, the second DNN 120), and thus the network may stably output a corresponding depth image even when an original depth image is extremely sparse and even has a severely omitted or missing portion. Such a design may exhibit desirable effects in two tasks, for example, depth cavity filling and sparse depth densification to be described hereinafter with reference to in FIG. 4.

Figure 4:
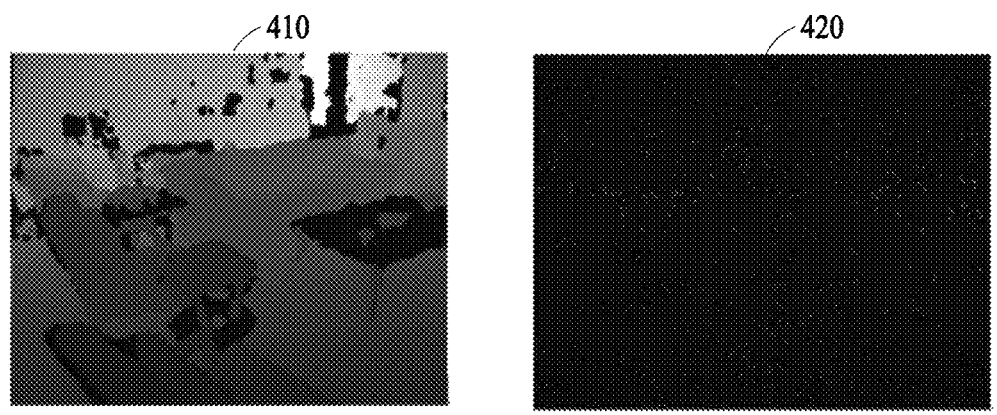
FIG. 4 illustrates examples of depth images in two modes.

FIG. 4 illustrates examples of depth images in two modes.

Referring to FIG. 4, a depth image 410 may have sequential missing values, and have sequential and dense depth values in regions that are not a cavity. A depth image 420 may be a sparse depth image in which white points indicate points having a depth value and black regions may indicate regions having no depth value. A brightness of the white region may indicate an increase and decrease in distance, and a higher level of white brightness may indicate an increased distance and a lower level of white brightness may indicate a decreased distance. For a cavity complementing task, the depth image complementing model 100 may be trained using, as a training sample, a depth image from which a space is omitted or missing, for example, the depth image 410. For a sparse depth densifying task, the depth image complementing model 100 may be trained using, as a training sample, a sparse depth image, for example, the depth image 420.

Hereinafter, a method of training the depth image complementing model 100 will be described in detail.

In an example, a training sample may first be prepared. The training sample may include an original color image and an original depth image. The original color image and the original depth image may correspond to each other. For example, the original color image and the original depth image collected by a sensor through image registration may be projected into the same coordinate system such that pixels of the two images may correspond to each other one-to-one.

When there are insufficient training samples, data may be expanded by data increasing operations such as, for example, a random horizontal flip, a random vertical flip, and a color jitter. Such operations may enable a network to learn corresponding relationships in more scenarios and different environments, thereby enhancing model robustness.

In an example, for a cavity complementing task, the training sample may include a plurality of pairs each including an original color image and an original depth image. In this example, the original depth image may be an image without a cavity. For a sparse depth densifying task, the training sample may include a plurality of pairs each including an original color image and a sparse depth image. The sparse depth image may be obtained through a database including the sparse depth image, or obtained by performing sparse sampling on a depth image ground truth value or a dense depth image. For example, when an original depth image is a depth image without a cavity, a sparse depth image may be obtained by filling the original depth image and obtaining a depth image ground truth value and then performing sparse sampling on the depth image ground truth value. That is, the depth image complementing model 100 may be trained with pairs of original color images and sparse depth images, in addition to pairs of original color images and original depth images. Thus, the purposes of both the cavity complementing task and the sparse depth densifying task may be satisfied simultaneously.

In an example, the training sample may also have a loss function. Model training is to continuously update parameters of a network through backpropagation using an Adam optimization program under a condition where monitoring is performed based on the loss function, and may thus enable the network to be more suitable for input data and reduce a difference between a predicted depth image and an actual depth image.

In one example, a structural loss obtained based on a structural similarity index measure (SSIM) between a predicted depth pixel and an actual depth image may also be used for the loss function, in addition to a mean squared error (MSE) between a value of the predicted depth pixel and a value of a pixel of the actual depth image. Using the losses, it is possible to improve the quality of an obtained final depth image and remove noise and chessboard effects of the network, thereby enhancing detailed information of the final depth image and increasing the quality of edges of the final depth image.

Figure 5:
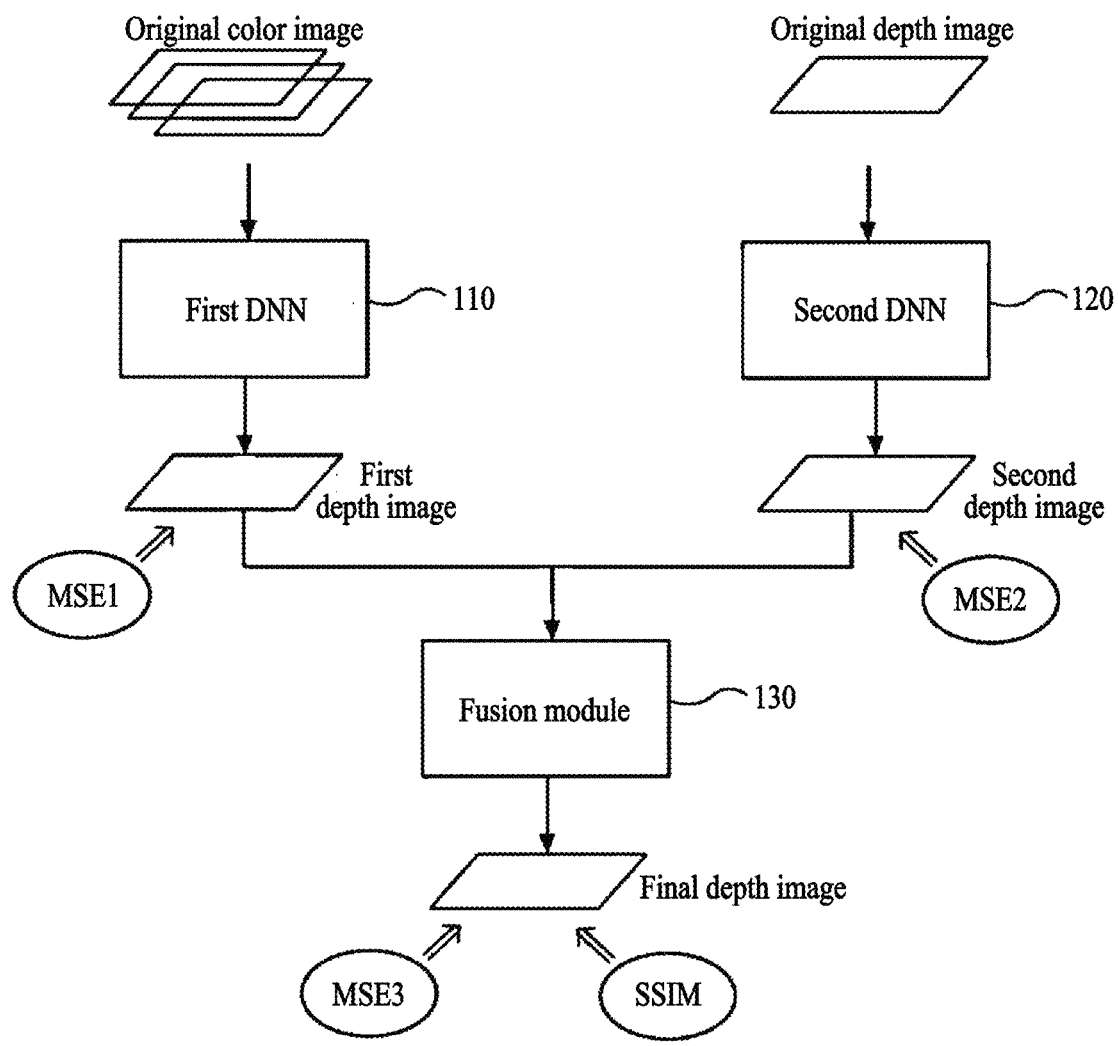
FIG. 5 illustrates an example of a loss function.

FIG. 5 illustrates an example of a loss function.

Referring to FIG. 5, for a color branch to learn a mapping relationship between a color image and a depth image, an MSE loss function, for example, MSE1, may be used to monitor a depth prediction part of the color branch. Similarly, to learn a relationship between an original depth image and a complemented depth image, an MSE loss function, for example, MSE2, may be used for a depth prediction part of a depth branch. For a final depth fusion part, MSE and SSIM loss functions, for example, MSE3 and SSIM, may be used to monitor a final depth image.

An MSE loss function may be represented by Equation 2 below.

$$MSE = \frac{1}{N}\sum_{i=0}^{N}(D-D^*)^2 \quad \text{[Equation 2]}$$

In Equation 2, N denotes the number of valid pixels in an image, and D and D* denote a predicted depth value and an actual depth value, respectively.

An SSIM loss function may be represented by Equation 3 below.

$$L_{SSIM}=1-\text{SSIM}(x,y) \quad \text{[Equation 3]}$$

In Equation 3, SSIM denotes a structural similarity index, and x and y denote a predicted depth image and a direct actual depth image, respectively. SSIM may be represented by Equation 4 below.

$$SSIM(x,y) = \frac{(2\mu_x\mu_y+c_1)(2\sigma_{xy}+c_2)}{(\mu_x^2+\mu_x^2+c_1)(\sigma_x^2+\sigma_y^2+c_2)} \quad \text{[Equation 4]}$$

In Equation 4, $\mu_x$ denotes a mean pixel value of an x image, and $\mu_y$ denotes a mean pixel value of a y image. $\sigma_x^2$ denotes a pixel value variance of the x image, and $\sigma_y^2$ denotes a pixel value variance of the y image. $\sigma_{xy}$ denotes a pixel value covariance of the x image and the y image. $c_1$ and $c_2$ denote constants. A structural similarity range may be 0 to 1.

An example of the loss function may be represented by Equation 5 below.

$$\text{Loss}=\vec{\lambda}\cdot\vec{l}=\lambda_1\cdot l_{out}+\lambda_2\cdot i_{ssim}+\lambda_3\cdot l_D+\lambda_4\cdot l_C \quad \text{[Equation 5]}$$

In Equation 5, $\vec{\lambda}$ denotes a vector of a loss weight coefficient, and may actually indicate a penalty effect of another loss function. For example, as a non-limiting example, $\vec{\lambda}=[0.5, 1.0, 0.25, 0.25]$, and $\vec{l}$ denotes a loss vector including four types of loss, for example, MSE3, SSIM, MSE2, and MSE1. In addition, $I_{out}$ denotes an MSE loss of a final depth image, and $I_{ssim}$ denotes a structural loss of a final depth map. $I_D$ and $I_C$ denote MSE losses of a depth prediction branch and a depth estimation branch, respectively.

Figure 6:
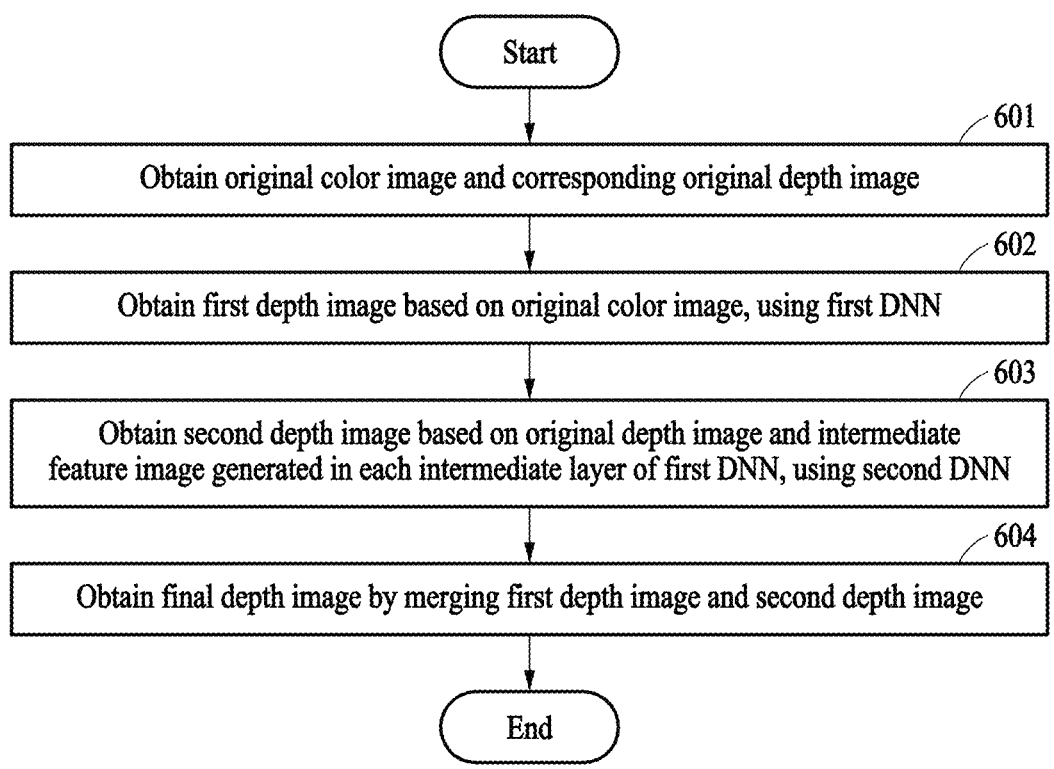
FIG. 6 illustrates an example of a depth image complementing method.

FIG. 6 illustrates an example of a depth image complementing method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in operation 601, a depth image complementing apparatus may obtain an original color image and a corresponding original depth image. The original color image and the original depth image may be obtained by simultaneously capturing the same scene at the same position by a matched and calibrated color camera and depth camera, and registering the two images. In another example, the original color image and the original depth image may be obtained from a local memory or a local database, as needed. In another example, the original color image and the original depth image may be received from an external data source (e.g., Internet, server, database, etc.) through an input device or a transmission medium. The original color image and the original depth image may be images corresponding to each other. For example, by projecting, into the same coordinate system, the original color image and the original depth image collected by a sensor through image registration, pixels of the two images may correspond to each other one-to-one.

In the absence of the corresponding original depth image, the depth image complementing apparatus may obtain, as the original depth image, a depth image of which a pixel value is 0.

In operation 602, the depth image complementing apparatus may obtain a first depth image based on the original color image, using a first DNN. For example, the depth image complementing apparatus may generate the first depth image through the first DNN 110 of the depth image complementing model 100.

In operation 603, the depth image complementing apparatus may obtain a second depth image based on the original depth image and an intermediate feature image generated by each intermediate layer of the first DNN, using a second DNN. For example, the depth image complementing apparatus may generate the second depth image through the second DNN 120 of the depth image complementing model 100.

For example, the obtaining of the second depth image may include performing feature decoding based on an output of the first encoder network 112 and the second encoder network 122, an intermediate feature image of the first decoder network 113, and an intermediate feature image of the second encoder network 122, using the second decoder network 123. In this example, an input of a first layer decoding unit of the second decoder network 123 may be a sum of a feature image output from the second encoder network 122 and a feature image output from the first encoder network 112. In addition, an input of each layer decoding unit as a decoding unit from a second layer up to an Nth layer of the second decoder network 123 may be a feature image obtained by fusing a feature image output from an upper layer decoding unit, a feature image output from a corresponding layer decoding unit of the first decoder network 113, and a feature image output from a corresponding layer encoding unit of the second encoder network 122, using an SE block.

In another example, the obtaining of the second depth image may include performing feature coding based on the original depth image and an intermediate feature image of the first encoder network 112, using the second encoder network 122 of the second DNN 120. In this example, an input of a first layer coding unit of the second encoder network 122 may be a sum of a first feature image output from the first preprocessing network 111 and a second feature image output from the second preprocessing network 121. In addition, an input of each layer coding unit as a coding unit from a second layer up to an Nth layer of the second encoder network 122 may be a sum of a feature image output from an upper layer coding unit and a feature image output from a corresponding layer coding unit of the first encoder network 112.

For example, the obtaining of the second depth image may include transforming the original depth image into a second feature image suitable for DNN processing using the second preprocessing network 121 and inputting the second feature image to the second encoder network 122, and synthesizing, into the second depth image, a feature image obtained by fusing the second feature image and a feature image output by the first decoder network 113 and the second decoder network 123 using the second depth prediction network 124. In this example, an input of the second depth prediction network 124 may be a feature image obtained by fusing a feature image output from the second decoder network 123, a feature image output from the first decoder network 113, and the second feature image output by the second preprocessing network 121, using the SE block.

In operation 604, the depth image complementing apparatus may obtain a final depth image by merging the first depth image and the second depth image. For example, operation 604 of obtaining the final depth image by merging the first depth image and the second depth image may be performed through the fusion module 130 of the depth image complementing model 100.

In an example, the fusion module 130 may be implemented by an attention network. In such a case, using the attention network, the final depth image may be obtained by obtaining a first pixel weight map of the first depth image and a second pixel weight map of the second depth image, and assigning a weight to each of the first depth image and the second depth image based on the first pixel weight map and the second pixel weight map and obtaining a sum therefrom.

The depth image complementing method may further include training the first DNN, the second DNN, and/or the attention network using a loss function before using the first DNN, the second DNN, and/or the attention network. The training may be performed through the method of training the depth image complementing model 100 described above.

The method of training the depth image complementing model 100 may include generating a loss function based on a first MSE loss (MSE1) between the first depth image and an actual depth image, a second MSE loss (MSE2) between the second depth image and the actual depth image, a third MSE loss (MSE3) between the final depth image and the actual depth image, and a structural loss (SSIM) between the final depth image and the actual depth image. The structural loss may be 1-SSIM. For example, the loss function may be obtained through a weighted summation of the first MSE loss, the second MSE loss, the third MSE loss, and the structural loss.

Figure 7:
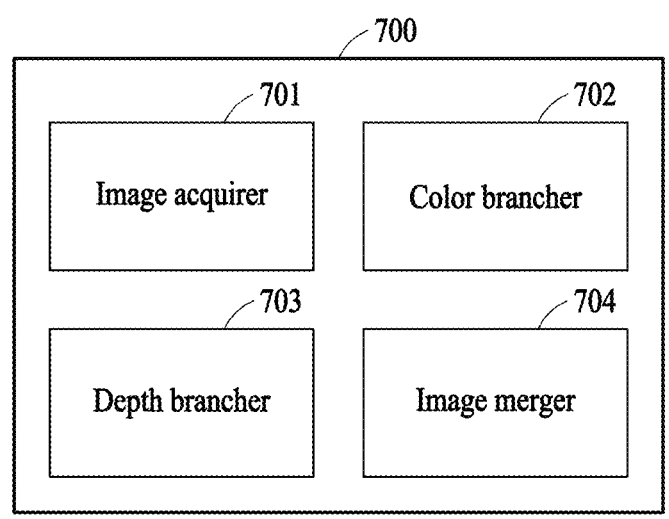
FIG. 7 illustrates an example of a depth image complementing apparatus.

FIG. 7 illustrates an example of a depth image complementing apparatus.

Referring to FIG. 7, a depth image complementing apparatus 700 may include an image acquirer 701, a color brancher 702, a depth brancher 703, and an image merger 704.

The image acquirer 701 may obtain an original color image and a corresponding original depth image. The original color image and the original depth image may be obtained by capturing the same scene at the same position by a matched and calibrated color camera and depth camera, respectively, and registering the two captured images. In another example, the original color image and the original depth image may be obtained from a local memory or a local database, as needed. In another example, the original color image and the original depth image may be received from an external data source (e.g., Internet, server, database, etc.) through an input device or a transmission medium. The original color image and the original depth image may be images corresponding to each other. For example, the original color image and the original depth image collected by a sensor through image registration may be projected into the same coordinate system such that pixels of the two images correspond to each other in the two images one-to-one.

In the absence of the corresponding original depth image, the image acquirer 701 may obtain, as the original depth image, a depth image of which a pixel value is 0.

The color brancher 702 may obtain a first depth image based on the original color image, using a first DNN. For example, the first depth image may be generated through the first DNN 110 of the depth image complementing model 100.

The depth brancher 703 may obtain a second depth image based on the original depth image and an intermediate feature image generated by each intermediate layer of the first DNN, using a second DNN. For example, the second depth image may be generated through the second DNN 120 of the depth image complementing model 100.

For example, the depth brancher 703 may be configured to perform feature decoding based on an output of the first encoder network 112 and the second encoder network 122, an intermediate feature image of the first decoder network 113, and an intermediate feature image of the second encoder network 122, using the second decoder network 123. In this example, an input of a first layer decoding unit of the second decoder network 123 may be a sum of a feature image output from the second encoder network 122 and a feature image output from the first encoder network 112. In addition, an input of each layer decoding unit as a decoding unit from a second layer up to an Nth layer of the second decoder network 123 may be a feature image obtained by fusing a feature image output from an upper layer decoding unit, a feature image output from a corresponding layer decoding unit of the first decoder network 113, and a feature image output from a corresponding layer encoding unit of the second encoder network 122, through a method using an SE block.

For example, the depth brancher 703 may be configured to perform feature coding based on the original depth image and an intermediate feature image of the first encoder network 112, using the second encoder network 122 of the second DNN 120. In this example, an input of a first layer coding unit of the second encoder network 122 may be a sum of a first feature image output from the first preprocessing network 111 and a second feature image output from the second preprocessing network 121. In addition, an input of each layer coding unit as a coding unit from a second layer up to an Nth layer of the second encoder network 122 may be a sum of a feature image output from an upper layer coding unit and a feature image output from a corresponding layer coding unit of the first encoder network 112.

The depth brancher 703 may transform the original depth image into a second feature image suitable for DNN processing using the second preprocessing network 121, input the second feature image to the second encoder network 122, and synthesize, into the second depth image, a feature image obtained by fusing the second feature image and a feature image output by the first decoder network 113 and the second decoder network 123 using the second depth prediction network 124. An input of the second depth prediction network 124 may be a feature image obtained by fusing a feature image output from the second decoder network 123, a feature image output from the first decoder network 113, and the second feature image output from the second preprocessing network 121, through the method using the SE block.

The image merger 704 may obtain a final depth image by merging the first depth image and the second depth image. For example, the final depth image may be obtained by merging the first depth image and the second depth image, through the fusion module 130 of the depth image complementing model 100.

The fusion module 130 may be implemented through an attention network. In such a case, using the attention network, the image merging module 704 may obtain the final depth image by obtaining a first pixel weight map of the first depth image and a second pixel weight map of the second depth image, and by assigning a weight to each of the first depth image and the second depth image based on the first pixel weight map and the second pixel weight map and obtaining a sum therefrom.

The depth image complementing apparatus 700 may further include a training module (not shown) or may be included in a communication device or a distributed network that communicates with the training module. The training module may train the first DNN, the second DNN, and/or the attention network using a loss function before using the first DNN, the second DNN, and/or the attention network. The training may be performed by the method of training the depth image complementing model 100 described above.

The training module may generate the loss function based on a first MSE loss (MSE1) between the first depth image and an actual depth image, a second MSE loss (MSE2) between the second depth image and the actual depth image, a third MSE loss (MSE3) between the final depth image and the actual depth image, and a structural loss (SSIM) between the final depth image and the actual depth image. The structural loss may be 1-SSIM. The training module may obtain the loss function through a weighted summation of the first MSE loss, the second MSE loss, the third MSE loss, and the structural loss.

Hereinafter, an example of implementing a sparse depth densifying task based on an NYU-Depth-V2 (hereinafter simply "NYU") database by the depth image complementing method described herein will be described in detail.

In a first step, a training sample is prepared by processing data in advance. The NYU database provided 465 indoor scenes collected by Kinect and RGB images collected by a color camera, of which 249 scenes are used as training scenes and 216 scenes are used as verification scenes. In addition, images with 654 annotations are provided as test sets. In addition, camera parameters and data preprocessing tools were provided. A data preprocessing process is as follows.

(1) Matching, projection, and clipping is performed on original data using officially provided tools, and original image data including a total of approximately 500K image pairs of the same resolution is obtained. Of these, training scenes are approximately 220K, and test scenes are approximately 280K.

(2) An original image may provide only a portion of a depth image ground truth value. Thus, for another depth image that does not provide a depth image ground truth value, all depth images were filled using an officially introduced colorization method, and ground truth values of all the depth images are obtained.

(3) For the comparison with an existing method, 50K image pairs are randomly selected from the training scenes and the selected image pairs are used to train the depth image complementing model 100.

(4) All the training images are adjusted to have the size of 304×224, for example. However, the size of a training image is not limited to the foregoing example.

(5) Sparse sampling is performed on the ground truth values of all the depth images obtained in (2), and 500 valid pixels, for example, are randomly selected from the depth image ground truth values to generate a sparse depth image.

(6) Random horizontal flip, random vertical flip, and color jitter are performed on depth images to diversify the data.

(7) A depth image is transformed into a tensor, and the tensor is input to the depth image complementing model 100 for processing.

In a second step, the depth image complementing model 100 is trained by using accurate training samples and referring to the loss function described above with reference to FIG. 5. In such a training process, a batch size is 4 and an initial learning rate is 0.001, with a ½ reduction per five epochs. The training is performed with a total of 50 epochs.

In a third step, after the training is completed, parameters of the depth image complementing model 100 are fixed. In this step, the depth image complementing model 100 learned a complete depth image mapping relationship with original depth images and original color images of the training data. A new pair of training data is transmitted to the depth image complementing model 100, and the depth image complementing model 100 inferred a complemented depth image.

A cavity depth complementing task may also be implemented in a similar way described above based on the NYU database according to the depth image complementing method described herein. Thus, a more detailed description of the implementation of the cavity depth complementing task will be omitted here for brevity.

As described above, the depth image complementing method described herein may be more effective in the cavity depth complementing task and the sparse depth densifying task, compared to an existing method.

1) Depth Cavity Complementing Task

In the case of the NYU database, final accuracy is verified by using, as training sets, all data sets (approximately 500K) of depth image pairs that do not provide ground truth values and using, as test sets in a test process, 1449 official image pairs having complete depth maps.

The training and test is performed through an open source code representation of DeepLiDAR, and cavity depth-complemented data was obtained. As indicated in Table 1 below, the depth image complementing method may be more effective than DeepLiDAR in terms of various indicators such as, for example, a root MSE (RMSE), a mean absolute error (MAE), an inverse RMSE (iRMSE), and an inverse MAE (iMAE).

TABLE 1

Comparison of cavity depth complementing performance on NYU data sets (unit: mm)

| Algorithm | RMSE | MAE | iRMSE | IMAE |
|---|---|---|---|---|
| DeepLiDAR | 82.033001 | 49.314480 | 16.459752 | 9.298696 |
| DepthNet (model 100) | 36.783371 | 12.827534 | 5.660427 | 1.995547 |

2) Sparse Depth Complementing Task

In terms of data configuration, training sets are 50K depth image pairs that are randomly selected from official training sets (approximately 220K), expanded through data augmentation. In a test process, final accuracy is verified using 654 official image pairs as test sets.

A test result was based on the test sets of the NYU-Depth-V2 data sets, and all input images are randomly sampled from depth images with corresponding ground truth values and a sparse sampled image having 500 valid points is obtained. A test of complementing a depth from a spare depth to a dense depth was performed. As indicated in Table 2 below, the depth image complementing method described herein may be effective than an existing network in terms of various indicators, for example, an RMSE and a relative error (REL).

TABLE 2

Comparison of sparse depth complementing performance on NYU data sets (unit: mm)

| Algorithm | RMSE | REL |
|---|---|---|
| Dfusenet | 219.5 | 0.0441 |
| Sparse-to-dense | 200 | 0.038 |
| CSPN++ | 115.0 | |
| DeepLiDAR | 115.0 | 0.022 |
| DepthNet (model 00) | 105.65 | 0.015 |

By comparing results of the two tasks, the depth image complementing method described herein may exhibit a greater level of performance in the two tasks, particularly, the sparse depth complementing task. Thus, it is verified that the performance of the depth image complementing method is more effective than the other used currently methods. Based on the test results, it is verified that a model described herein is robust. For different missing patterns, the model described herein may generate a complete depth map through a depth estimation network based on a color image, fuse it with a depth image generated by a depth prediction branch of a depth image region, and thus output a relatively reasonable depth image even when a depth image is missing.

According to an example embodiment, there is provided a computing device. The computing device may include a processor and a memory. The memory may store therein a computer program. When the computer program is executed by the processor, the depth image complementing method described herein may be implemented.

The depth image complementing method and apparatus may perform depth estimation using an original color image through a color branching network, and learn a mapping from the color image to a complete depth image. In addition, to help complement ae depth image maximally utilizing color image information, the depth image complementing method and apparatus may perform depth inference (prediction) using an original depth image and some intermediate layer feature images of the color branching network, through a depth branching network. Thus, even when the original depth image is extremely sparse, or even when the original depth image is not present, the depth image complementing method and apparatus may allow the model described herein to stably generate a high-quality complete depth image, and have good results in both a depth cavity filling task and a sparse depth densifying task.

In addition, the depth image complementing method and apparatus may transmit mask information using a gated convolution, through the depth branching network, and thus effectively distinguish valid and invalid pixels of an image and allow a generated depth image to preserve original depth information.

In addition, the depth image complementing method and apparatus may perform complementation through SSIM-related structural loss monitoring in a process of training the model, and thus allow a finally generated depth image to have sufficient detailed information and a high edge quality.

Further, the depth image complementing method and apparatus may perform end-to-end model training, and thus avoid the use of an intermediate feature and effectively avoid the risk of using an intermediate feature of a low quality.

The depth image complementing method and apparatus have been described above with reference to FIGS. 1A through 7.

For example, the example embodiments described herein may be implemented by a computing device, and the computing device may include a storage and a processor. The computing device may be, for example, a personal computer (PC), a tablet computer, a personal information terminal, a personal digital assistant (PDA), a smartphone, a web application, or a device configured to execute the instruction set.

The computing device may be a device for executing the depth image complementing method described herein, and a computer-executable instruction set may be stored in the storage device. When the computer-executable instruction set is executed by the computing device, the depth image complementing method described above with reference to FIG. 6 may be performed.

The depth image complementing apparatus 700, the image acquirer 701, the color brancher 702, the depth brancher 703, the image merger 704 and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated herein that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of method of complementing a depth image. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of complementing a depth image, comprising:
obtaining a first depth image based on only a color image, using a first deep neural network (DNN);
obtaining a second depth image based on only an original depth image, corresponding to the color image, and an intermediate feature image generated by each intermediate layer of the first DNN, using a second DNN to perform feature fusion including inputting the intermediate feature image from each intermediate layer of the first DNN to each corresponding intermediate layer of the second DNN; and
obtaining a final depth image by merging the first depth image and the second depth image,
wherein the feature fusion is only performed at the second DNN.

2. The method of claim 1,
wherein the first DNN comprises a first encoder network and a having an N-layer residual structure,
wherein the second DNN comprises a second encoder network and a second decoder network having the N-layer residual structure,
wherein N is an integer greater than 1, and
wherein the obtaining of the second depth image further comprises performing feature decoding using the second decoder network, based on an output of the first encoder network, an output of the second encoder network, an intermediate feature image of the first decoder network, and an intermediate feature image of the second encoder network.

3. The method of claim 2, wherein the obtaining of the second depth image further comprises:
performing feature encoding using the second encoder network of the second DNN, based on the color image and an intermediate feature image of the first encoder network.

4. The method of claim 2,
wherein the first DNN further comprises a first preprocessing network preceding the first encoder network, and a first depth prediction network after the first decoder network,
wherein the obtaining of the first depth image comprises:
transforming the color image into a first feature image for DNN processing using the first preprocessing network and inputting the first feature image to the first encoder network; and
synthesizing, into the first depth image, a feature image output from the first decoder network using the first depth prediction network,
wherein the second DNN further comprises a second preprocessing network preceding the second encoder network, and a second depth prediction network after the second decoder network, and
wherein the obtaining of the second depth image comprises:
transforming the original depth image into a second feature image for DNN processing using the second preprocessing network and inputting the second feature image to the second encoder network; and
obtaining the second depth image by fusing the second feature image, the feature image output by the first decoder network, and a feature image output by the second decoder network, using the second depth prediction network.

5. The method of claim 4,
wherein an input of a first layer of the second decoder network is a sum of a feature image output from the second encoder network and a feature image output from the first encoder network,
wherein an input of each layer of the second decoder network, from a second layer up to an Nth layer of the second decoding network, comprises a respective feature image obtained by fusing a feature image output from a previous layer of the second decoder network, a corresponding feature image output from a corresponding layer of the first decoder network, and another corresponding feature image output from a corresponding layer of the second encoder network, using a squeeze-and-excitation (SE) block-based method, and
wherein an input of the second depth prediction network comprises a feature image obtained by fusing the feature image output from the second decoder network, the feature image output from the first decoder network, and the second feature image using the SE block-based method.

6. The method of claim 5, wherein an input of a first layer of the second encoder network comprises a sum of the first feature image and the second feature image, and
an input of each layer of the second encoder network, from a second layer up to an Nth layer of the second encoder network, is a sum of a feature image output from a previous layer of the second encoder network and a feature image output from a corresponding layer of the first encoder network.

7. The method of claim 2, wherein a respective residual block of each of the second encoder network and the second decoder network is configured to execute a gated process in response to executing a convolution process.

8. The method of claim 1, wherein the obtaining of the final depth image by merging the first depth image and the second depth image comprises:
obtaining a first pixel weight map of the first depth image and a second pixel weight map of the second depth image, using an attention network; and
obtaining the final depth image by assigning a respective weight to each of the first depth image and the second depth image based on the first pixel weight map and the second pixel weight map and obtaining a sum therefrom.

9. The method of claim 8, further comprising:
generating a loss function based on a first mean squared error (MSE) loss of a training first depth image and an actual depth image, a second MSE loss of a training second depth image and the actual depth image, a third MSE loss of a training final depth image and the actual depth image, and a structural loss of the training final depth image and the actual depth image; and
generate the first DNN, the second DNN, and/or the attention network by respectively training an in-training first DNN, an in-training second DNN, and/or an in-training attention network using the loss function before the use of the first DNN, the use of the second DNN, and/or the use of the attention network, wherein the structural loss comprises a structural similarity index measure (SSIM), wherein the training first depth image is obtained using the in-training first DNN based on a training color image, wherein the training second depth image is obtained using the in-training second DNN based on a training depth image corresponding to the training color image, and a training intermediate feature image generated by each intermediate layer of the in-training first DNN, and wherein the training final depth image is obtained by merging the training first depth image and the training second depth image.

10. The method of claim 9, wherein the generating of the loss function further comprises obtaining the loss function based on a weighted summation of the first MSE loss, the second MSE loss, the third MSE loss, and the structural loss.

11. The method of claim 1, wherein the obtaining of the color image and the original depth image further comprises:
obtaining, as the depth image, a depth image of which a pixel value is 0, in response to an absence of the depth image.

12. The method of claim 1, wherein the feature fusion is performed at the second DNN by combining the intermediate feature image of the first DNN with the corresponding intermediate layer of the second DNN.

13. The method of claim 1, wherein each of the intermediate layers of the first DNN is a single layer of a respective block, of plural layers, of the first DNN.

14. The method of claim 13, wherein each of the corresponding intermediate layers is single layer of a respective block, of multiple layers, of the second DNN.

15. The method of claim 14, wherein at least one of the respective blocks of the first DNN comprises two convolution layers and/or at least one of the respective blocks of the second DNN comprises two convolution layers.

16. A non-transitory computer-readable storage medium storing commands that, when executed by a processor, cause the processor to perform the method of claim 1.

17. An apparatus for complementing a depth image, comprising:
one or more processors configured to:
obtain a first depth image based on only a color image, using a first deep neural network (DNN);
obtain a second depth image based on only an original depth image, corresponding to the color image, and an intermediate feature image generated by each intermediate layer of the first DNN, using a second DNN to perform feature fusion including inputting the intermediate feature image from each intermediate layer of the first DNN to each corresponding intermediate layer of the second DNN; and
obtain a final depth image by merging the first depth image and the second depth image,
wherein the feature fusion is only performed at the second DNN.

18. The apparatus of claim 17, further comprising:
a memory storing instructions that when executed by the one or more processors configures the one or more processors to perform the obtaining of the first depth image, the obtaining of the second depth image, and the obtaining of the final depth image.

19. The apparatus of claim 17,
wherein the first DNN comprises a first encoder network and a first decoder network having an N-layer residual structure, wherein the second DNN comprises a second encoder network and a second decoder network having an N-layer residual structure, wherein N is an integer greater than 1, and wherein, for the obtaining of the second depth image, the one or more processors are further configured to perform feature decoding using the second decoder network, based on an output of the first encoder network, an output of the second encoder network, an intermediate feature image of the first decoder network, and an intermediate feature image of the second encoder network.

20. The apparatus of claim 19, wherein, for the obtaining of the second depth image, the one or more processors are configured to perform feature encoding using the second encoder network of the second DNN, based on the original depth image and an intermediate feature image of the first encoder network.

21. The apparatus of claim 19,
wherein the first DNN further comprises a first preprocessing network preceding the first encoder network, and a first depth prediction network after the first decoder network, wherein, for the obtaining of the first depth image, the one or more processors are further configured to:
transform the color image into a first feature image for DNN processing using the first preprocessing network, input the first feature image to the first encoder network; and synthesize, into the first depth image, a feature image output from the first decoder network using the first depth prediction network, wherein the second DNN further comprises a second preprocessing network preceding the second encoder network and a second depth prediction network after the second decoder network, and wherein, for the he obtaining of the second depth image, the one or more processors are further configured to:
transform the original depth image into a second feature image for DNN processing using the second preprocessing network, input the second feature image to the second encoder network; and obtain the second depth image by fusing the second feature image, the feature image output by the first decoder network, and the feature image output by the second decoder network, using the second depth prediction network.

22. The apparatus of claim 17, wherein, for the obtaining of the final depth image, the one or more processors are further configured to:
obtain a first pixel weight map of the first depth image and a second pixel weight map of the second depth image, using an attention network; and obtain the final depth image by assigning a respective weight to each of the first depth image and the second depth image based on the first pixel weight map and the second pixel weight map and obtaining a sum therefrom.

23. The apparatus of claim 22, wherein the one or more processors are further configured to:
generate a loss function based on a first mean squared error (MSE) loss of a training first depth image and an actual depth image, a second MSE loss of a training second depth image and the actual depth image, a third MSE loss of a training final depth image and the actual depth image, and a structural loss of the training final depth image and the actual depth image; and generate the first DNN, the second DNN, and/or the attention network by respectively training an in-training first DNN, an in-training second DNN, and/or an in-training attention network using the loss function before the use of the first DNN, the use of the second DNN, and/or the use of the attention network, wherein the structural loss comprises a structural similarity index measure (SSIM), wherein the training first depth image is obtained using the in-training first DNN based on a training color image, and wherein the training second depth image is obtained using the in-training second DNN based on a training depth image corresponding to the training color image, and a training intermediate feature image generated by each intermediate layer of the in-training first DNN, and wherein the training final depth image is obtained by merging the training first depth image and the training second depth image.

24. The apparatus of claim 23, wherein, for the generation of the loss function, the one or more processors are configured to:

generate the loss function based on a weighted summation of the first MSE loss, the second MSE loss, the third MSE loss, and the structural loss.

25. The apparatus of claim 14, wherein each of the intermediate layers of the first DNN is a single layer of a respective block, of plural layers, of the first DNN.

26. The apparatus of claim 25, wherein at least one of the respective blocks of the first DNN comprises two convolution layers.

27. The apparatus of claim 26, wherein each of the corresponding intermediate layers is single layer of a respective block, of multiple layers, of the second DNN, and wherein at least one of the respective blocks of the second DNN comprises two convolution layers.

* * * * *